: US 10,769,216 B2
(45) Date of Patent: Sep. 8, 2020

(12) United States Patent
Maita et al.

(54) DATA ACQUISITION METHOD, DATA ACQUISITION APPARATUS, AND RECORDING MEDIUM

(71) Applicant: FUJITSU LIMITED, Kawasaki-shi, Kanagawa (JP)

(72) Inventors: Tsuyoshi Maita, Aomori (JP); Nobumi Noro, Aomori (JP); Tetsu Tanaka, Hirosaki (JP)

(73) Assignee: FUJITSU LIMITED, Kawasaki (JP)

( * ) Notice: Subject to any disclaimer, the term of this patent is extended or adjusted under 35 U.S.C. 154(b) by 715 days.

(21) Appl. No.: 15/589,150

(22) Filed: May 8, 2017

(65) Prior Publication Data
US 2017/0300574 A1    Oct. 19, 2017

Related U.S. Application Data

(63) Continuation of application No. PCT/JP2014/080268, filed on Nov. 14, 2014.

(51) Int. Cl.
*G06F 16/951* (2019.01)
*G06F 16/958* (2019.01)
*G06F 16/00* (2019.01)

(52) U.S. Cl.
CPC ............ *G06F 16/951* (2019.01); *G06F 16/00* (2019.01); *G06F 16/958* (2019.01)

(58) Field of Classification Search
CPC .... G06F 16/2246; G06F 16/951; G06Q 10/10
See application file for complete search history.

(56) References Cited

U.S. PATENT DOCUMENTS

| | | | |
|---|---|---|---|
| 6,754,648 B1 * | 6/2004 | Fittges | G06F 16/2246 707/684 |
| 6,973,458 B1 | 12/2005 | Maeda et al. | |
| 2006/0004780 A1 * | 1/2006 | Maeda | G06Q 10/10 |
| 2010/0049772 A1 * | 2/2010 | Jing | G06F 16/951 707/776 |
| 2011/0113046 A1 | 5/2011 | Isozu | |

(Continued)

FOREIGN PATENT DOCUMENTS

EP    1 100 023 A2    5/2001
JP    2001-109742    4/2001

(Continued)

OTHER PUBLICATIONS

Extended European Search Report, dated Oct. 6, 2017, in European Application No. 14905762.2 (6 pp.).

(Continued)

*Primary Examiner* — Etienne P Leroux
(74) *Attorney, Agent, or Firm* — Staas & Halsey LLP

(57) ABSTRACT

A non-transitory computer-readable recording medium storing a data acquisition program that causes a computer to execute a process including: identifying a position of a part to be extracted in a document that is associated with a specific URL and includes structural information of tags, the position being on a hierarchical structure of the tags included in the document, and allowing the position on the hierarchical structure to be registered; and accessing periodically or non-periodically the document associated with the specific URL, and extracting and outputting data corresponding to the registered position on the hierarchical structure of the tags.

18 Claims, 10 Drawing Sheets

(56) References Cited

U.S. PATENT DOCUMENTS

2013/0024441 A1  1/2013  Sun et al.
2014/0129541 A1  5/2014  Sun et al.
2015/0106357 A1  4/2015  Sun et al.

FOREIGN PATENT DOCUMENTS

JP  2001-202283  7/2001
JP  2011-100403  5/2011
JP  2012-103929  5/2012
JP  2014-522030  8/2014

OTHER PUBLICATIONS

International Search Report dated Feb. 17, 2015 in corresponding International Application No. PCT/JP2014/080268.
Written Opinion Of The International Searching Authority dated Feb. 17, 2015 in corresponding International Application No. PCT/JP2014/080268.

* cited by examiner

FIG.2

| URLID | TARGET URL | POSITION IDENTIFICATION INFORMATION OF PART TO BE EXTRACTED | |
|---|---|---|---|
| | | TITLE | ADDRESS |
| 1 | http://aaaa.bbb.ccc/ddd/eee/001.html | \<DIV class="title"\> \</DIV\>, ORDERING SEQUENCE NUMBER:1, /title/ | \<DIV class="address"\> \</DIV\>, ORDERING SEQUENCE NUMBER:1, /info/address/ |
| 2 | http://aaaa.bbb.ccc/ddd/eee/002.html | \<DIV class="title"\> \</DIV\>, ORDERING SEQUENCE NUMBER:2, /tps/table/ | /\<DIV.*\>(.+)\</DIV\>/ /ADDRESS:(.+)$/, ORDERING SEQUENCE NUMBER:3, /info/address/ |
| 3 | http://aaaa.bbb.ccc/ddd/eee/003.html | div#left h2, ORDERING SEQUENCE NUMBER:3, /tps/table/ | #infoContent @\<h3\>LOCATION\</h3\>\s+?\<p\>(.+?)\</p\>@is, ORDERING SEQUENCE NUMBER:5, /info/address/ |
| ⋮ | ⋮ | ⋮ | ⋮ |

| ITEM ID | DATA NAME | DATA TYPE | SEGMENTING TECHNIQUE | ... |
|---|---|---|---|---|
| 1 | TITLE | CHARACTER | CSS SELECTOR | ... |
| 2 | ADDRESS | CHARACTER | CSS SELECTOR, REGULAR EXPRESSION | ... |
| 3 | TELEPHONE NUMBER | NUMBER | CSS SELECTOR, REGULAR EXPRESSION | ... |
| 4 | DATE OF UPDATE | DATE | REGULAR EXPRESSION | ... |
| 5 | POSITIONAL INFORMATION | LATITUDE AND LONGITUDE | CSS SELECTOR, REGULAR EXPRESSION | ... |
| 6 | DESCRIPTION | CHARACTER | CSS SELECTOR | ... |
| ... | ... | ... | ... | ... |

FIG.4

| URLID | TARGET URL | STORAGE AREA |
|---|---|---|
| 1 | http://aaaa.bbb.ccc/ddd/eee/001.html | D:\page\aaaa.bbb.ccc\ddd\eee\001 |
| 2 | http://aaaa.bbb.ccc/ddd/eee/002.html | D:\page\aaaa.bbb.ccc\ddd\eee\002 |
| 3 | http://aaaa.bbb.ccc/ddd/eee/003.html | D:\page\aaaa.bbb.ccc\ddd\eee\003 |
| ⋮ | ⋮ | ⋮ |

| URLID | TITLE | ADDRESS | TELEPHONE NUMBER | DATE OF UPDATE | POSITIONAL INFORMATION | DESCRIPTION | ... |
|---|---|---|---|---|---|---|---|
| 1 | SANNAI-MARUYAMA SITE | xxx AZA MARUYAMA, SANNAI, AOMORI-SHI | 017-781-xxxx | 2014/10/20 | N40° 81' 12"<br>E140° 69' 56" | THE SANNAI-MARUYAMA SITE, A SPECIAL HISTORICAL SITE, IS ... | ... |
| 2 | HAKKODA ROPEWAY | yyy AZA KANSUIZAWA, ARAKAWA, AOMORI-SHI | 017-738-yyyy | 2014/10/29 | N40° 68' 08"<br>E140° 83' 18" | THE HAKKODA ROPEWAY IS ... | ... |
| 3 | TSUGARU-HAN NEPUTA VILLAGE | zzz KAMENOKO-MACHI, HIROSAKI-SHI, AOMORI | 0172-39-zzzz | 2014/6/3 | N40° 61' 15"<br>E140° 46' 92" | THE TSUGARU-HAN NEPUTA VILLAGE IS ... | ... |
| ... | ... | ... | ... | ... | ... | ... | ... |

| SETTINGS FOR PART TO BE EXTRACTED | | | | |
|---|---|---|---|---|
| SELECTION OF PART TO BE EXTRACTED | PRIORITY RANKING | EXTRACTION DEFINITION | CONVERSION PROCESS | RESULT CHECK |
| TITLE ▶<br>☑ IMPORTANT ITEM<br>☐ ADD TO addinfo<br>☐ SAVE FILE　DELETE | 0 | Div#left h2 | | CHECK |
| CATEGORY ▶<br>☐ IMPORTANT ITEM<br>☐ ADD TO addinfo<br>☐ SAVE FILE　DELETE | 0 | Ul#bread<br>@\<a href=".+?category=\d+?">(.+?)\</a>@si | | CHECK |
| DESCRIPTION ▶<br>☐ IMPORTANT ITEM<br>☐ ADD TO addinfo<br>☐ SAVE FILE　DELETE | 0 | #photoContent<br>@\<p>(.+?)\</p>@is | | CHECK |
| ADDRESS ▶<br>☐ IMPORTANT ITEM<br>☐ ADD TO addinfo<br>☐ SAVE FILE　DELETE | 0 | <#infoContent<br>@\<h3>LOCATION\</h3>\s+?\<p>(.+?)\</p>@is> | replace /〒[0-3-]+/ /s<br>replace /TEL:.+/ /s | CHECK<br>ABOUT 100% |

| SOURCE | |
|---|---|
| Http://aaa.bbbb.ccc/ddd/eee/OO/.html | |

DAWN\<br\>

\</p\>

\<h3\>VENUE\</h3\>

\<p\>

ABC SHRINE\<br\>

\</p\>

\<h3\>LOCATION\</h3\>

\<p\>

〒XXX-XXXX\<br\> ABCD, AOMORI-SHI, AOMORI\<br\>

ABCD, AOMORI-SHI, AOMORI

\</p\>

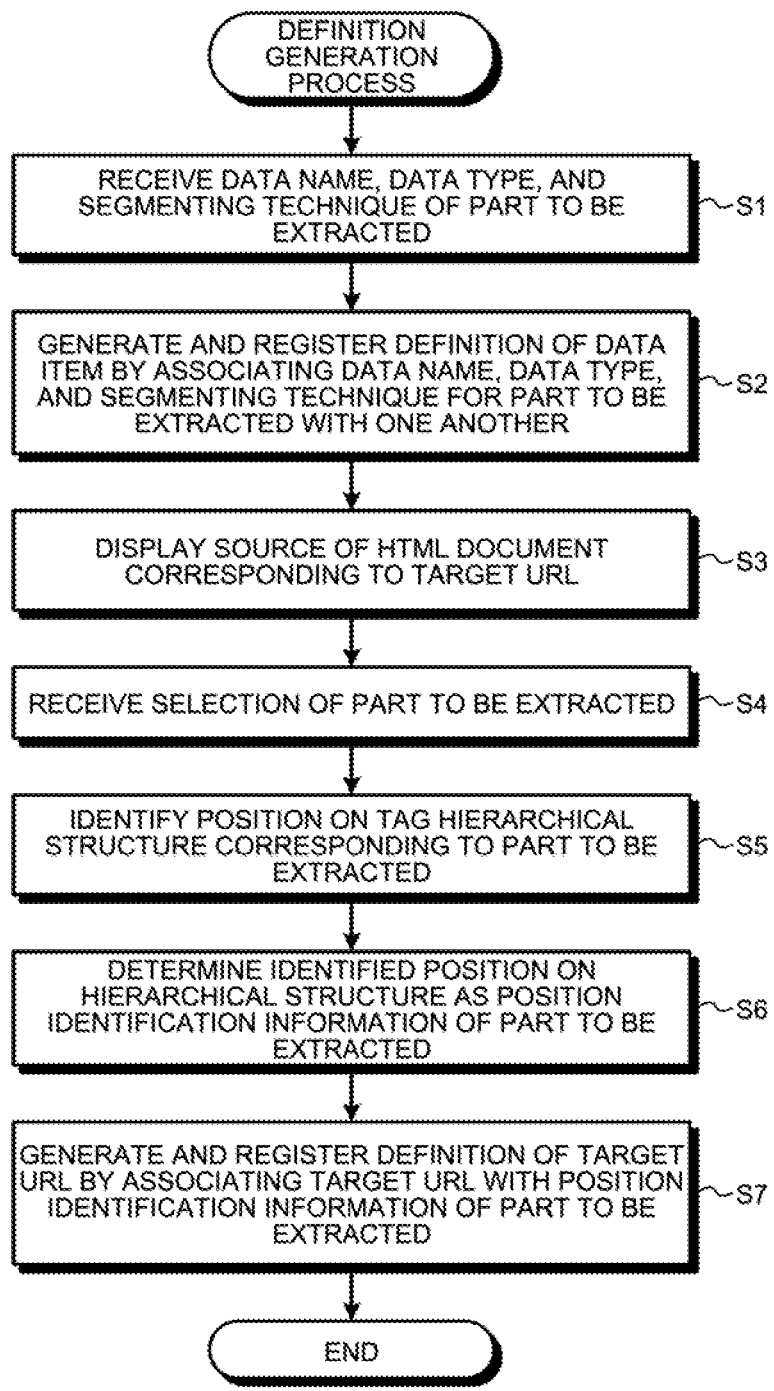

DATA ACQUISITION METHOD, DATA ACQUISITION APPARATUS, AND RECORDING MEDIUM

CROSS-REFERENCE TO RELATED APPLICATION

This application is a continuation application of International Application PCT/JP2014/080268, filed on Nov. 14, 2014, and designating the U.S., the entire contents of which are incorporated herein by reference.

FIELD

The present invention relates to a data acquisition program, a data acquisition method, and a data acquisition apparatus.

BACKGROUND

Crawler tools have been known as tools for collecting information published on the Internet. A crawler tool goes round Web pages on the Internet, and stores contents thereof in uniform resource locator (URL) units, that is, in page units. Further, it has been proposed to detect presence or absence of update of a part by: analyzing contents of Web pages and the like; identifying a location specified by a user; and when a new content is received, extracting a corresponding specified location from the new content and comparing the corresponding specified location with the original data.

Further, it has been proposed to generate a page part including a content of a specified portion that is able to be independent, which is a portion that is able to be processed independently of a Web page, that is, a Web page, when tag information of the part that is able to be independent is extracted and the portion that is able to be independent is specified by a user. Furthermore, it has been proposed to generate a new Web page, based on the generated page part.

Patent Document 1: Japanese Laid-open Patent Publication No. 2001-202283

Patent Document 2: Japanese Laid-open Patent Publication No. 2001-109742

However, in a case where specific information is collected from various Web pages on the Internet, for example, if a received content or a Web page based on a generated page part is referred to, other information that is not aimed to be collected may be included. Therefore, it is difficult to collect only the specific information and output highly versatile data.

SUMMARY

According to an aspect of the embodiments, a non-transitory computer-readable recording medium stores a data acquisition program that causes a computer to execute a process including: identifying a position of a part to be extracted in a document that is associated with a specific URL and includes structural information of tags, the position being on a hierarchical structure of the tags included in the document, and allowing the position on the hierarchical structure to be registered; and accessing periodically or non-periodically the document associated with the specific URL, and extracting and outputting data corresponding to the registered position on the hierarchical structure of the tags.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of a target storage unit;

FIG. 3 is a diagram illustrating an item storage unit;

FIG. 4 is a diagram illustrating an example of a page storage unit;

FIG. 5 is a diagram illustrating an example of an extracted data storage unit;

FIGS. 6A and 6B are diagrams illustrating an example of a reception screen for a part to be extracted;

FIG. 7 is a flow chart illustrating an example of a definition generation process;

DESCRIPTION OF EMBODIMENTS

Hereinafter, based on the drawings, embodiments of a data acquisition program, a data acquisition method, and a data acquisition apparatus, which are disclosed by the present application, will be described in detail. The disclosed techniques are not limited by these embodiments. Further, the following embodiments may be combined with one another as appropriate so long as no contradiction is caused thereby.

EMBODIMENTS

Figure 1:
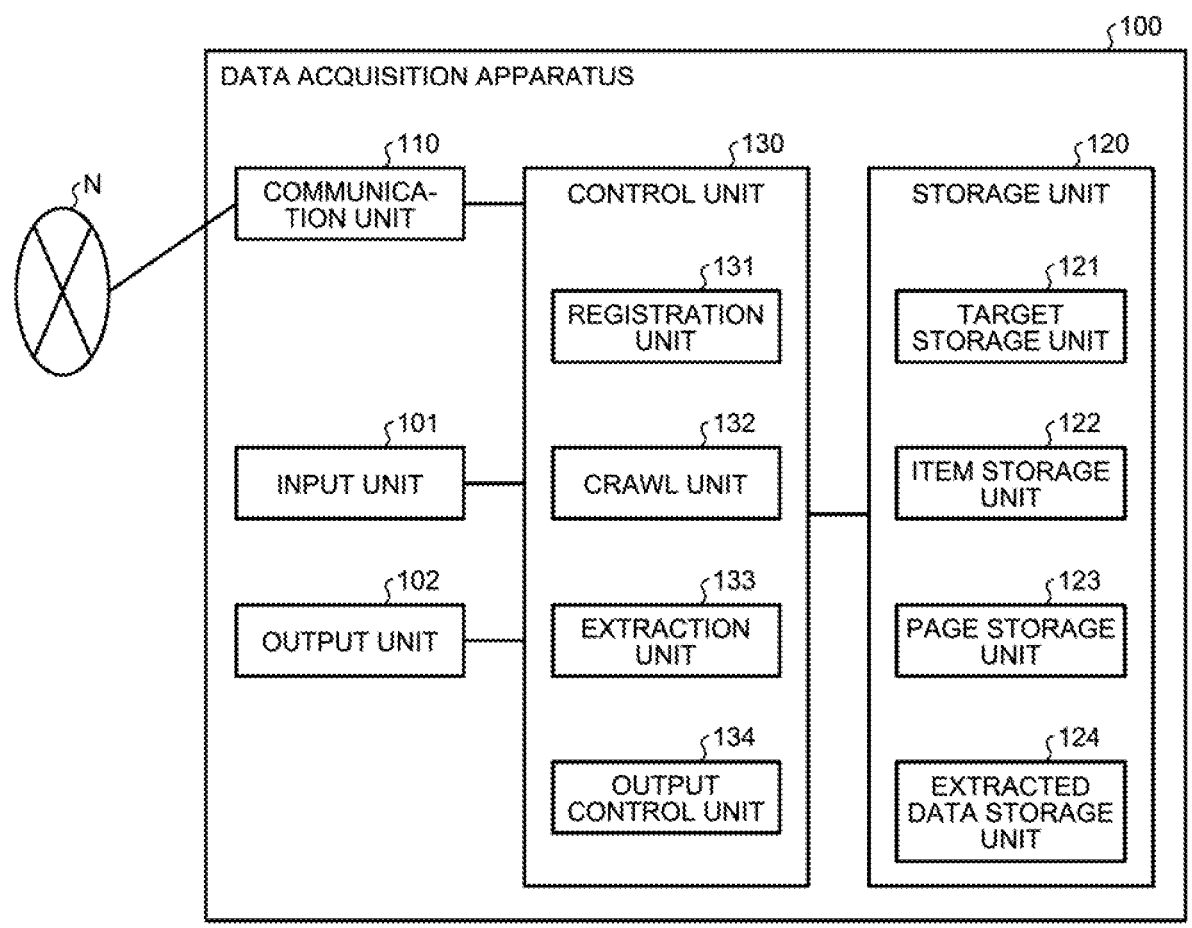
FIG. 1 is a block diagram illustrating an example of a configuration of a data acquisition apparatus.

FIG. 1 is a block diagram illustrating an example of a configuration of a data acquisition apparatus. A data acquisition apparatus 100 illustrated in FIG. 1, for example: is connected to the Internet, via a network N; goes round Web pages (hereinafter, also referred to as "sites") on the Internet, the Web pages having been specified by an administrator; and acquires predetermined data and accumulates the predetermined data in a database. In order to acquire tourist information of a certain region, for example, the data acquisition apparatus 100 goes round sites of tourist attractions and tourist information sites provided by prefectures, and acquires data on an address, a telephone number, a description, and the like, of each tourist attraction. In the acquirement, formats of various data are often not unified among the respective sites of tourist attractions and tourist information sites. Thus, the data acquisition apparatus 100 generates, in advance, definitions of data items to be acquired, and acquires, based on the definitions, data from the respective sites.

That is, the data acquisition apparatus 100: identifies a position of a part to be extracted in a document, which is associated with a specific URL and includes structural information of tags, the position being on a hierarchical structure of the tags included in the document; and allows the position on the hierarchical structure to be registered. Further, the data acquisition apparatus 100 periodically or non-periodically accesses the document associated with the specific URL, and extracts and outputs data corresponding to the registered position on the hierarchical structure of the tags. Thereby, the data acquisition apparatus 100 is able to extract and output data of targeted parts even if specific tag information is not available for documents of sites having various data in different formats.

A document including structural information of tags may be, for example, a document described in a markup language, and this may be, for example, a HyperText Markup Language (HTML) document, an Extensible Markup Language (XML) document, or the like. In the following description, a case where Web pages using HTML documents are gone round will be described as an example.

Next, the configuration of the data acquisition apparatus 100 will be described. As illustrated in FIG. 1, the data acquisition apparatus 100 has an input unit 101, an output unit 102, a communication unit 110, a storage unit 120, and a control unit 130. The data acquisition apparatus 100 may have various functional units that a known computer has, in addition to the functional units illustrated in FIG. 1.

The input unit 101 is, for example, an input device, such as a keyboard, or a mouse, and receives input of various information from an administrator of the data acquisition apparatus 100. For example, a URL of a site that is to be gone round, data items that are to be acquired, and the like are input to the input unit 101 by the administrator of the data acquisition apparatus 100, and the input unit 101 outputs results of the input to the control unit 130. Further, the input unit 101 may be, for example, a reader-writer for a secure digital (SD) memory card, or the like. The input unit 101, for example, outputs a URL of a site that is to be gone round, data items that are to be acquired, and the like, which have been read from the SD memory card, to the control unit 130. The input unit 101 may have both of the input device and the reader-writer for the SD memory card or the like.

The output unit 102 is, for example, a display device for displaying thereon various information. The output unit 102 is realized by, for example, a liquid crystal display or the like, serving as the display device. Further, the output unit 102 may be a reader-writer for an SD memory card or the like. When output data are input to the output unit 102 from the control unit 130, the output unit 102 displays the output data or writes the output data into the memory card. The input unit 101 and the output unit 102 may be integrated together, and may be, for example, a device having both of their functions, like a reader-writer for an SD memory card or the like. Further, the output unit 102 may have both a display device and an SD card reader-writer, for example.

The communication unit 110 is realized by, for example, a network interface card (NIC), or the like. The communication unit 110 is a communication interface, which is connected to, for example, the Internet via the network N wiredly or wirelessly, and which controls communication of information with servers of various sites on the Internet. The communication unit 110 receives page contents, for example, HTML documents, image files, and the like, from various sites on the Internet. The communication unit 110 outputs the received page contents to the control unit 130. Further, the communication unit 110 transmits page requests and the like input from the control unit 130 to various sites on the Internet.

The storage unit 120 is realized by, for example: a semiconductor memory element, such as a random access memory (RAM) or a flash memory; or a storage device, such as a hard disk or an optical disk. The storage unit 120 has a target storage unit 121, an item storage unit 122, a page storage unit 123, and an extracted data storage unit 124. Further, the storage unit 120 stores therein information used in processing at the control unit 130.

The target storage unit 121 stores therein URLs (hereinafter, referred to as target URLs) of a site to be subjected to a crawl process, in which data are acquired, in association with position identification information of parts to be extracted from HTML documents. That is, the target storage unit 121 stores therein definitions of target URLs. FIG. 2 is a diagram illustrating an example of the target storage unit. As illustrated in FIG. 2, the target storage unit 121 has items, such as "URL ID", "target URL", and "position identification information of part to be extracted". Further, "position identification information of part to be extracted" has items, such as "title" and "address". "Position identification information of part to be extracted" additionally has items, such as "telephone number", "date of update", "positional information", and "description", although illustration thereof will be omitted. The target storage unit 121 stores therein, for example, one record for each target URL.

"URL ID" identifies a target URL. "Target URL" indicates a URL of an HTML document to be accessed in a crawl process. A target URL is input, for example, through the input device of the input unit 101 by an administrator. "Position identification information of part to be extracted" indicates information for identifying a position of a part to be extracted in an HTML document of a target URL. "Title" indicates a position of a title in a targeted HTML document, the position being on a hierarchical structure of tags, by a combination of one or more of: a name of a tag; an ordering sequence number of the tag in the document; and a hierarchical structure of tags. "Address" indicates a position of an address in the targeted HTML document, the position being on the hierarchical structure of the tags, by a combination of one or more of: a name of a tag; an ordering sequence number of the tag in the document; and a hierarchical structure of tags.

An example in a first line in FIG. 2 indicates position identification information of a title and an address in an HTML document of a target URL, "http://aaaa.bbb.ccc/ddd/eee/001.html", which has a URL ID, "1". The position identification information of the title is expressed as, for example, "<DIV class="title"> </DIV>, ordering sequence number:1,/title/". "<DIV class="title"> </DIV>", for example, indicates a name of a tag indicating the title extracted by use of a Cascading Style Sheets (CSS) selector. Further, "ordering sequence number:1" indicates the first tag of tags indicating titles in the HTML document. Further, "/title/" indicates a hierarchical structure of tags indicating the title of the HTML document. Data extracted as the title from the HTML document are the part enclosed by the DIV tags.

Similarly, the position identification information of the address is expressed as, for example, "<DIV class="address"> </DIV>,ordering sequence number:1,/info/address/". "<DIV class="address"> </DIV>" indicates, for example, a name of a tag indicating the address extracted by use of a CSS selector. Further, "ordering sequence number:1" indicates the first tag of tags indicating addresses in the HTML document. Furthermore, "/info/address/" indicates a hierarchical structure of tags indicating the address of the HTML document. Data extracted as the address from the HTML document are the part enclosed by the DIV tags. Moreover, position identification information of a part to be extracted may be identified by use of one or more of: a name of a tag; an ordering sequence number of the tag; and a hierarchical structure of tags.

Further, a name of a tag may be expressed by use of a regular expression. An example in a second line in FIG. 2 expresses a name of a tag indicating an address, as "/<DIV.*>(.+)</DIV>//address:(.+)$/". In the regular expression, the part enclosed by the DIV tags, or the part following after "address:" is the data extracted as the address. Furthermore, position identification information of a part to be extracted may be a combination a CSS selector and a regular expression.

Further, like an example in a third line in FIG. 2, position identification information of a part to be extracted may be expressed by use of a segmenting technique. In this case, position identification information of a title is expressed as, for example, "div#left h2,ordering sequence number:3,/tps/table/", by use of a CSS selector. Further, position identification information of an address is expressed as, for example, "#infoContent @<h3>location</h3>¥s+?<p>(.+?)</p>@is, ordering sequence number:5,/info/address/", by use of a CSS selector and a regular expression.

Returning to description of FIG. 1, the item storage unit 122 stores therein definitions of data items to be extracted from page contents of target URLs. FIG. 3 is a diagram illustrating an example of the item storage unit. As illustrated in FIG. 3, the item storage unit 122 has items, such as "item ID", "data name", "data type", and "segmenting technique". The item storage unit 122 stores therein, for example, one record for each data name.

Herein, "item ID" identifies a data item, that is, a data name. Further, "data name" indicates a name of data to be extracted. Examples of a data name include data, such as "title", "address", "telephone number", "date of update", "positional information", and "description". "Data type" indicates a type of extracted data, when the extracted data are stored in the extracted data storage unit 124. Examples of a data type include types, such as, "character", "number", "date", and "latitude and longitude". "Segmenting technique" indicates a technique for segmenting, that is, for extracting data from a page content of a target URL. Examples of a segmenting technique include techniques, such as a CSS selector, and a regular expression.

Returning to description of FIG. 1, the page storage unit 123 stores therein, for a target URL, a page content acquired by access through a crawl process, that is, an HTML document, an image file, or the like. FIG. 4 is a diagram illustrating an example of the page storage unit. As illustrated in FIG. 4, the page storage unit 123 has items, such as "URL ID", "target URL", and "storage area". The page storage unit 123 stores therein, for example, one record for each target URL.

"URL ID" identifies a target URL. "Target URL" indicates a URL of an HTML document accessed in a crawl process. "Storage area" indicates a storage area storing therein an HTML document, an image file, or the like, which has been acquired. In the storage area, for example, a directory of a file system of the storage unit 120 is stored, and an HTML document, an image file, or the like is stored in a directory corresponding thereto. The page storage unit 123 may directly store therein the acquired HTML document or image file in the storage area.

Returning to description of FIG. 1, the extracted data storage unit 124 stores therein data of a part to be extracted that have been extracted from an HTML document. That is, the extracted data storage unit 124 is a database, in which data collected by a crawl process are stored. FIG. 5 is a diagram illustrating an example of the extracted data storage unit. As illustrated in FIG. 5, the extracted data storage unit 124 has items, such as "URL ID", "title", "address", "telephone number", "date of update", "positional information", and "description". The extracted data storage unit 124 stores therein, for example, one record for each URL ID.

"URL ID" identifies a target URL. "Title" is one of data items extracted from an HTML document of the target URL, and indicates a title of the HTML document of the target URL. "Address" is one of the data items extracted from the HTML document of the target URL, and indicates an address described in the HTML document of the target URL. "Telephone number" is one of the data items extracted from the HTML document of the target URL, and indicates a telephone number described in the HTML document of the target URL. "Date of update" is one of the data items extracted from the HTML document of the target URL, and indicates a date of update described in the HTML document of the target URL. "Positional information" indicates a latitude and a longitude. The latitude and longitude are acquired, based on the address extracted from the HTML document of the target URL, by use of, for example, an external application programming interface (API) service. The positional information may be, if there is description of the latitude and longitude in the HTML document, that latitude and longitude. "Description" is one of the data items extracted from the HTML document of the target URL, and indicates, for example, a description related to a tourist attraction in the document, if the HTML document of the target URL is a document related to the tourist attraction. If the address is not described in the HTML document, the address may be, for example, an address acquired by utilization of an external API service by use of, for example, a tourist attraction name described in the title.

Returning to description of FIG. 1, the control unit 130 is realized by, for example, a program stored in a storage device inside thereof being executed by a central processing unit (CPU), a micro processing unit (MPU), or the like, with a RAM being a work area. Further, the control unit 130 may be realized, for example, by an integrated circuit, such as an application specific integrated circuit (ASIC) or a field programmable gate array (FPGA). The control unit 130 has a registration unit 131, a crawl unit 132, an extraction unit 133, and an output control unit 134, and realizes or executes functions and actions of information processing described below. The internal configuration of the control unit 130 is not limited to the configuration illustrated in FIG. 1, and may be any other configuration as long as the control unit 130 is configured to perform the later described information processing.

The registration unit 131 registers definitions of target URLs and definitions of data items. The registration unit 131 receives, for example, input of a data name, a data type, and a segmenting technique, for a part to be extracted, by an administrator operating the input unit 101. The registration unit 131 generates a definition of a data item by associating the received data name, data type, and segmenting technique, with one another. The registration unit 131 registers the generated definition of the data item in the item storage unit 122. That is, the registration unit 131 registers generated definitions of data items in the item storage unit 122.

The registration unit 131 outputs a source of an HTML document corresponding to a target URL to the output unit 102 and causes the output unit 102 to display the source. The registration unit 131 receives, for example, selection of a part to be extracted on the displayed source of the HTML document corresponding to the target URL, by an administrator operating the input unit 101. The registration unit 131 may cause the HTML document of the target URL to be displayed, and receive selection of the part to be extracted on the HTML document.

The registration unit 131 identifies a position on a hierarchical structure of tags, the position corresponding to the received part to be extracted. The registration unit 131 determines the identified position on the hierarchical structure, as position identification information of the part to be extracted. Further, the registration unit 131 determines, together with the identified position on the hierarchical structure, a name of a tag corresponding to the part to be extracted, and an ordering sequence number of the tag in the document, as the position identification information of the part to be extracted. The registration unit 131 receives, for each of data items in the HTML document of the target URL, selection of a part to be extracted, and identifies a position thereof on the hierarchical structure of the tags. Further, if there are a plurality of target URLs, the registration unit 131 similarly identifies, for an HTML document corresponding to each of the target URLs, a position on a hierarchical structure of tags, the position corresponding to a part to be extracted. The registration unit 131 generates a definition of a target URL by associating the target URL with position identification information of a part to be extracted. The registration unit 131 stores the generated definition of the target URL in the target storage unit 121. That is, the registration unit 131 registers generated definitions of target URLs in the target storage unit 121.

By use of FIGS. 6A and 6B, a reception screen for a part to be extracted will now be described. FIGS. 6A and 6B are diagrams illustrating an example of the reception screen for a part to be extracted. As illustrated in FIGS. 6A and 6B, a reception screen 21 has an area 22 where a source of an HTML document is displayed, and an area 23 where selection of a part to be extracted is received. When the registration unit 131 receives, for example, selection of "address" as a part to be extracted, "address" is selected in a selection column for a part to be extracted in the area 23. When "address" is selected, the registration unit 131 reads a definition of a data item corresponding to "address" from the item storage unit 122, and displays the definition in an extracted definition column 24. Editable text may be displayed in the extracted definition column 24.

The registration unit 131 causes a part corresponding to one or more of a CSS selector and a regular expression in the extracted definition column 24 to be displayed as a part to be extracted 25 on the source displayed in the area 22 with a background thereof being colored, for example. When the part to be extracted 25 is checked by an administrator, and, for example, a selection button on a user interface not illustrated is pressed down, the registration unit 131 receives selection of the part to be extracted 25. Further, for example, the part to be extracted 25 in the area 22 may be selected by a mouse operation of an administrator, and the registration unit 131 may receive the selected part to be extracted 25.

Further, the registration unit 131 may perform a conversion process, in which unnecessary characters are deleted from the part to be extracted 25. In the example of FIGS. 6A and 6B, the registration unit 131 performs the conversion process for a character string of the part to be extracted 25 by using a conversion definition in a conversion process column 26 set by an administrator. By inserting a conversion result 27 below the part to be extracted 25, for example, the registration unit 131 causes a background thereof to be displayed with the background being colored in a color different from that of the part to be extracted 25. When the registration unit 131 has performed the conversion process, the registration unit 131 may cause the conversion result 27 to be selected as a part to be extracted and may receive the part to be extracted.

Returning to description of FIG. 1, the crawl unit 132 refers to the target storage unit 121, and accesses a Web page including a target URL, for example, a top page of a tourist information site. That is, the crawl unit 132 transmits a page request via the communication unit 110 to a server of the tourist information site, and receives a page content via the communication unit 110 from the server. For example, the crawl unit 132 accesses a Web page including a target URL periodically or non-periodically, that is, at intervals specified by an administrator in advance or at arbitrary timing. A specified interval may be, for example, any interval, such as one day, one week, or one month. The crawl unit 132 refers to the target storage unit 121, and selects a target URL, for which a page content is to be acquired, from all of links in the Web page. The crawl unit 132, for example, selects a target URL of a page for each tourist attraction. The crawl unit 132 acquires a page content from the selected target URL. The crawl unit 132 stores the acquired page content in the page storage unit 123. Further, the crawl unit 132 outputs acquirement completion information indicating that acquirement of the page content has finished, to the extraction unit 133.

When the acquirement completion information is input to the extraction unit 133 from the crawl unit 132, the extraction unit 133 refers to position identification information of a part to be extracted in the target storage unit 121, and extracts data of a data item of the part to be extracted, from the page content of the target URL stored in the page storage unit 123. The extraction unit 133 stores the extracted data in association with a URL ID in the extracted data storage unit 124, according to a definition of the data item in the item storage unit 122. When the extraction unit 133 stores the extracted data in the extracted data storage unit 124, the extraction unit 133 outputs extraction completion information to the output control unit 134.

When extracting data of a data item of a part to be extracted, the extraction unit 133 extracts the data by using a technique specified by a segmenting technique in the item storage unit 122. The extraction unit 133 extracts an address by using a CSS selector, for which a hierarchy of a tag indicating the address is defined as, for example, "/info/address/", and ".address", for example, is described. In this case, the extraction unit 133 is able to segment an item including "address" in the tag, for example, as the address.

Further, the extraction unit 133 extracts an address by using a regular expression having, for example, ".info" described in the first line, "/<DIV.*>(.+)/DIV>/" described in the second line, and "/address:(.+)$/" described in the third line. In this case, the extraction unit 133 is able to segment, as the address, a character string following after a character string, "address:", from a hierarchy included in a tag with a class of the DIV tag being "info", for example.

Further, when the extraction unit 133 stores the extracted data in the extracted data storage unit 124, if the extracted data are different from data that have been extracted in the past, the extraction unit 133 may output information indicating that the data have changed, to the output unit 102 and cause the output unit 102 to display the information. That is, when data corresponding to a position on a hierarchical structure of tags, the data having been extracted and registered in the past, are different from data corresponding to the position on the hierarchical structure of the tags, the data having been extracted and registered this time, the extraction unit 133 outputs information indicating that the data have changed, to the output unit 102. Examples of the information indicating that the data have changed include messages, such as "The address has been updated. Please check.", and "The layout of the page has been changed. Please check.".

Further, if a plurality of positions of parts to be extracted have been registered for an HTML document, the extraction unit 133 outputs information to the output unit 102, the information according to the number or rate of data matching past data, in data corresponding to the plurality of positions. That is, if, for example, there are six data items that have been registered in an HTML document, and two sets of data are different from past data, the extraction unit 133 outputs a message like "Pieces of information at two positions have been updated. Please check.", to the output unit 102. Furthermore, if the extraction unit 133 performs a crawl process for an unknown Web page, the extraction unit 133 may output information to the output unit 102, the information according to the number or rate of data matching Web page data that have been acquired already. Examples of the information according to the number or rate of data matching Web page data that have been acquired already include a message, "The data matching rate with a similar page is 66%. Please check data items that do not match.".

When the extraction completion information is input to the output control unit 134 from the extraction unit 133, the output control unit 134 refers to the extracted data storage unit 124, and outputs the extracted data as output data to the output unit 102 and causes the output unit 102 to display the output data. Further, if data acquired and extracted by a past crawl process and data acquired and extracted by a current crawl process are different from each other, upon the output of the extracted data, the output control unit 134 may change a display color thereof, for example. If the output unit 102 is a reader-writer for an SD memory card or the like, the output control unit 134 outputs the extracted data as output data to the output unit 102, and causes the output data to be stored in the SD memory card, or the like.

Next, operation of the data acquisition apparatus 100 of the embodiment will be described. Firstly, a definition generation process, in which a definition of a target URL of a crawl process and a definition of a data item to be extracted are generated, will be described.

FIG. 7 is a flow chart illustrating an example of the definition generation process. For example, by an administrator operating the input unit 101, the registration unit 131 receives input of a data name, a data type, and a segmenting technique, for a part to be extracted (Step S1). The registration unit 131 generates a definition of a data item by associating the received data name, data type, and segmenting technique, with one another. The registration unit 131 registers the generated definition of the data item in the item storage unit 122 (Step S2).

The registration unit 131 outputs a source of an HTML document corresponding to a target URL to the output unit 102 and causes the output unit 102 to display the source (Step S3). The registration unit 131 receives selection of a part to be extracted on the displayed source of the HTML document corresponding to the target URL, by, for example, an administrator operating the input unit 101 (Step S4). The registration unit 131 identifies a position on a hierarchical structure of tags, the position corresponding to the received part to be extracted (Step S5). The registration unit 131 determines the identified position on the hierarchical structure, as position identification information of the part to be extracted (Step S6). Further, the registration unit 131 determines, together with the identified position on the hierarchical structure, a name of a tag corresponding to the part to be extracted, and an ordering sequence number of the tag in the document, as the position identification information of the part to be extracted. If there are a plurality of data items in the HTML document of the target URL, the registration unit 131 receives selection of respective parts to be extracted, and identifies positions thereof on the hierarchical structure of the tags.

The registration unit 131 generates a definition of the target URL by associating the target URL with the position identification information of the part to be extracted. The registration unit 131 registers the generated definition of the target URL in the target storage unit 121 (Step S7). Thereby, the data acquisition apparatus 100 is able to register the definition of the data item and the definition of the target URL.

Figure 8:
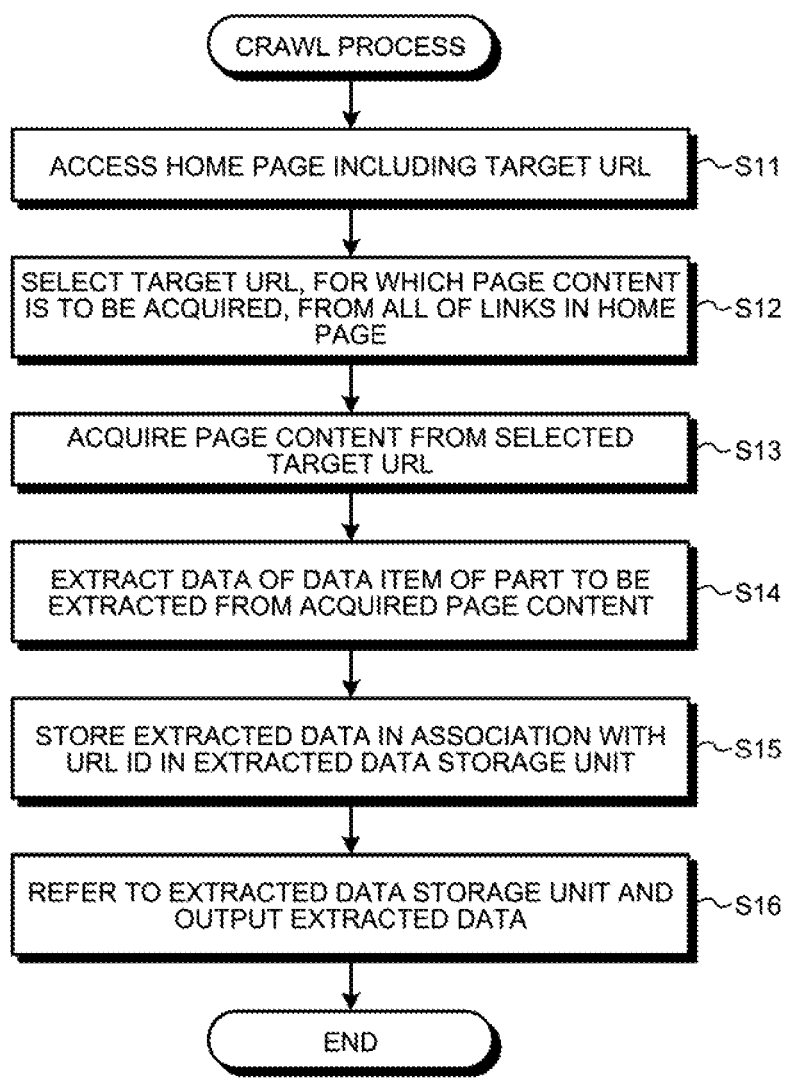
FIG. 8 is a flow chart illustrating an example of a crawl process.

Next, a crawl process will be described. FIG. 8 is a flow chart illustrating an example of the crawl process. The crawl unit 132 refers to the target storage unit 121, and accesses a Web page including a target URL (Step S11). The crawl unit 132 refers to the target storage unit 121, and selects a target URL, for which a page content is to be acquired, from all of links in the Web page (Step S12).

The crawl unit 132 acquires the page content from the selected target URL (Step S13). The crawl unit 132 stores the acquired page content in the page storage unit 123. Further, the crawl unit 132 outputs acquisition completion information indicating that acquisition of the page content has finished, to the extraction unit 133.

When the acquirement completion information is input to the extraction unit 133 from the crawl unit 132, the extraction unit 133 refers to position identification information of a part to be extracted in the target storage unit 121, and extracts data of a data item of the part to be extracted, from the page content of the target URL stored in the page storage unit 123 (Step S14).

The extraction unit 133 stores the extracted data in association with a URL ID, in the extracted data storage unit 124 (Step S15). When the extraction unit 133 stores the extracted data in the extracted data storage unit 124, the extraction unit 133 outputs extraction completion information to the output control unit 134. When the extraction completion information is input to the output control unit 134 from the extraction unit 133, the output control unit 134 refers to the extracted data storage unit 124, and outputs the extracted data to the output unit 102 and causes the output unit 102 to display the extracted data (Step S16). Thereby, the data acquisition apparatus 100 identifies and registers a position on a hierarchical structure of tags, and thus the data acquisition apparatus 100 is able to extract and output data of a targeted part from an HTML document even if specific tag information is not available. Further, the data acquisition apparatus 100 is able to collect various information from various Web pages having different formats to thereby construct a database unified into a predetermined format.

As described above, the data acquisition apparatus 100 identifies a position of a part to be extracted in a document, which is associated with a specific URL and includes structural information of tags, the position being on a hierarchical structure of the tags included in the document, and allows the position on the hierarchical structure to be registered. Further, the data acquisition apparatus 100 periodically or non-periodically accesses the document associated with the specific URL, and extracts and outputs data corresponding to the registered position on the hierarchical structure of the tags. As a result, data of a targeted part are able to be extracted and output even if specific tag information is not available.

Further, the data acquisition apparatus 100 identifies a position of a part to be extracted further by using a combination of: a name of a tag or an ordering sequence number of the tag in a document; and a hierarchical structure of tags. As a result, data of a targeted part are able to be extracted and output more accurately.

Further, when data corresponding to a position on a hierarchical structure of tags, the data having been extracted and registered in the past, are different from data corresponding to the position on the hierarchical structure of the tags, the data having been extracted and registered this time, the data acquisition apparatus 100 outputs information indicating that the data have changed. As a result, it is able to be easily determined that a document corresponding to a target URL has been updated.

Further, if a plurality of positions of parts to be extracted have been registered for a document, the data acquisition apparatus 100 performs output according to the number or rate of data matching past data, in data corresponding to the plurality of positions. As a result, even if a crawl process is performed for an unknown Web page, a definition for easy extraction of data is able to be set, and desired data are able to be extracted and output.

Further, the data acquisition apparatus 100 displays a document described in HTML format or a source of the document, and receives selection of a part to be extracted included in the displayed document or the displayed source of the document. Further, the data acquisition apparatus 100 identifies a hierarchy of a tag corresponding to the received part to be extracted, and registers the identified hierarchy as information identifying a position of the part to be extracted. As a result, a data item to be acquired by a crawl process is able to be set easily.

In the above described embodiment, a case where Web pages related to tourist attractions are gone around in a crawl process has been described, but the embodiment is not limited to this case. For example, Web pages related to disaster prevention information, traffic information, tour product information, job information, or the like may be gone round. Thereby, the data acquisition apparatus 100 is able to construct a database without omission by transversely collecting information on various Web pages with different administrators and integrating together data of the same attribute.

Further, in the above described embodiment, when, for example, data of an address are collected, a character string of a tag including "address", or a character string following after "address" in a regular expression is acquired, but the embodiment is not limited to this example. For example, a keyword likely to be used in as an address notation, such as "location", other than "address", may be acquired by use of a regular expression. Thereby, even if similar terms are used, the data acquisition apparatus 100 is able to form a database by integrating them as data of the same attribute.

Further, in this embodiment, the case where data are extracted for an HTML document corresponding to a target URL for each tourist attraction has been described, but the embodiment is not limited to this case. For example, information on multiple tourist attractions may be introduced on one page of a tourist information site. In such a case, the data acquisition apparatus 100 may perform division into respective tourist attractions by using a splitter, and may treat the divided parts as target URLs. Thereby, the data acquisition apparatus 100 is able to acquire desired data from Web pages of various formats.

Further, each component of the respective units illustrated in the drawings is not necessarily physically configured as illustrated in the drawings. That is, specific modes of separation and integration of the respective units are not limited to those illustrated in the drawings, and all or a part thereof may be configured to be functionally or physically separated or integrated in arbitrary units depending on various loads, use situations, and the like. For example, the crawl unit 132, the extraction unit 133, and the output control unit 134 may be integrated together into an output control unit.

Further, all or any part of the various processing functions executed in the respective devices may be executed on a CPU (or a micro computer, such as an MPU or a micro controller unit (MCU)). Further, needless to say, all or any part of the various processing functions may be executed on a program analyzed and executed by a CPU (or a micro computer, such as an MPU or MCU) or on hardware by wired logic.

Figure 9:
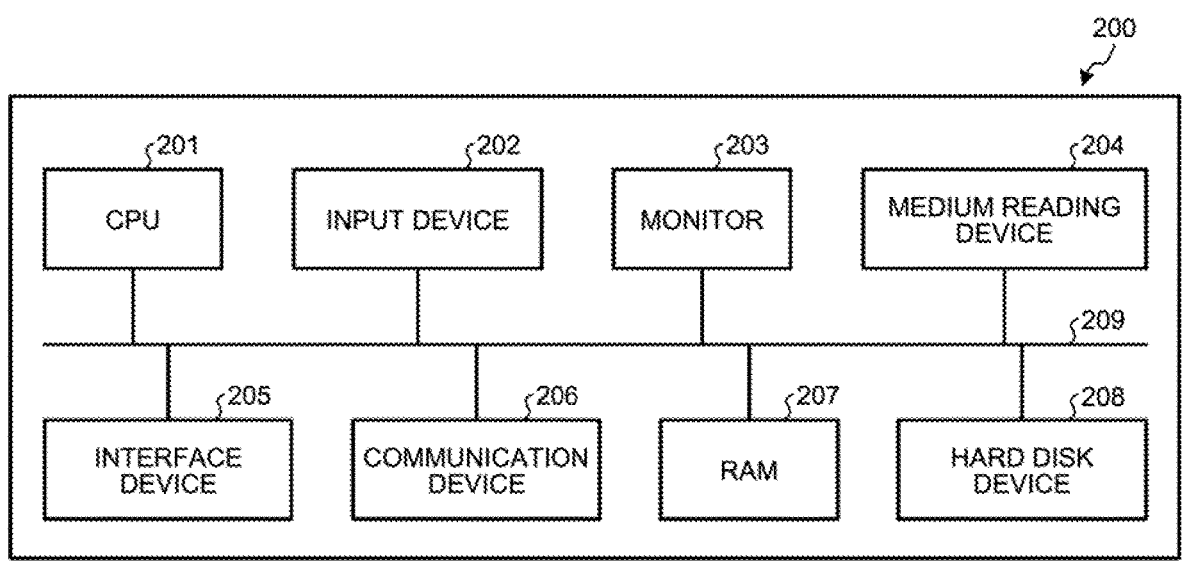
FIG. 9 is a diagram illustrating a computer that executes a data acquisition program.

The various processes described in the above embodiment may be realized by a program, which has been prepared in advance, being executed by a computer. Accordingly, hereinafter, an example of a computer that executes a program having the same functions as those of the above described embodiment will be described. FIG. 9 is a diagram illustrating an example of a computer that executes a data acquisition program.

As illustrated in FIG. 9, a computer 200 has a CPU 201 that executes various types of arithmetic processing, an input device 202 that receives data input, and a monitor 203. Further, the computer 200 has a medium reading device 204 that reads a program and the like from a storage medium, an interface device 205 for connecting to various devices, and a communication device 206 for connecting wiredly or wirelessly to another information processing device and the like. Furthermore, the computer 200 has a RAM 207 that temporarily stores therein various pieces of information, and a hard disk device 208. Further, each of these devices 201 to 208 is connected to a bus 209.

The hard disk device 208 stores therein the data acquisition program having functions that are the same as those of the respective processing units, which are the registration unit 131, the crawl unit 132, the extraction unit 133, and the output control unit 134 that are illustrated in FIG. 1. Further, the hard disk device 208 stores therein the target storage unit 121, the item storage unit 122, the page storage unit 123, the extracted data storage unit 124, and various data for realizing the data acquisition program. The input device 202 has functions equivalent to those of the input unit 101, and receives input of various pieces of information, such as a target URL, a definition, and management information, from, for example, an administrator of the computer 200. The monitor 203 has functions equivalent to those of the output unit 102, and displays thereon various screens, such as a screen for the management information, a reception screen, and a data display screen, to, for example, the administrator of the computer 200. A printing device and the like, for example, are connected to the interface device 205. The communication device 206, for example, has the same functions as those of the communication unit 110 illustrated in FIG. 1, is connected to the network N, and exchanges various pieces of information with sites on the Internet.

The CPU 201 executes various processes by reading respective programs stored in the hard disk device 208 and expanding and executing the programs in the RAM 207.

Further, these programs are able to cause the computer 200 to function as the registration unit 131, the crawl unit 132, the extraction unit 133, and the output control unit 134 that are illustrated in FIG. 1.

The above described data acquisition program is not necessarily stored in the hard disk device 208. For example, a program stored in a storage medium that is readable by the computer 200 may be read out and executed by the computer 200. The storage medium readable by the computer 200 corresponds to, for example: a portable recording medium, such as a CD-ROM, a DVD disk, or a universal serial bus (USB) memory; a semiconductor memory, such as a flash memory; or a hard disk drive. Further, this data acquisition program may be stored beforehand in a device connected to a public line, the Internet, a local area network (LAN), or the like, and the computer 200 may read and execute the data acquisition program therefrom.

Data of a targeted part are able to be extracted and output even if specific tag information is not available.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a data acquisition program that causes a computer to execute a process comprising:

identifying a position of a part to be extracted in a document that is associated with a specific URL and includes structural information of tags, the position being on a hierarchical structure of the tags included in the document, and allowing the position on the hierarchical structure to be registered; and accessing periodically or non-periodically the document associated with the specific URL, and extracting and outputting data corresponding to the registered position on the hierarchical structure of the tags, wherein when data corresponding to the position on the hierarchical structure of the tags, the data having been extracted and registered in the past, is different from data corresponding to the position on the hierarchical structure of the tags, the data having been extracted and registered this time, information indicating that the data have changed is output.

2. The non-transitory computer-readable recording medium according to claim 1, wherein the position of the part to be extracted is further identified by use of a combination of: a name of a tag or an ordering sequence number of the tag in the document;

and a hierarchical structure of tags.

3. A non-transitory computer-readable recording medium storing a data acquisition program that causes a computer to execute a process comprising:

identifying a position of a part to be extracted in a document that is associated with a specific URL and includes structural information of tags, the position being on a hierarchical structure of the tags included in the document, and allowing the position on the hierarchical structure to be registered; and accessing periodically or non-periodically the document associated with the specific URL, and extracting and outputting data corresponding to the registered position on the hierarchical structure of the tags, wherein when a plurality of positions of the part to be extracted have been registered for the document, output according to the number or rate of data matching past data, in data corresponding to the plurality of positions is performed.

4. The non-transitory computer-readable recording medium according to claim 3, wherein the position of the part to be extracted is further identified by use of a combination of: a name of a tag or an ordering sequence number of the tag in the document; and a hierarchical structure of tags.

5. A non-transitory computer-readable recording medium storing a data acquisition program that causes a computer to execute a process comprising:

displaying a document that is associated with a specific URL and described in HTML format or displaying a source of the document;

receiving a selection of a part to be extracted that is included in the displayed document or the displayed source of the document;

identifying a hierarchy of a tag corresponding to the received part to be extracted;

registering the identified hierarchy as information identifying a position of the part to be extracted; and accessing periodically or non-periodically the document associated with the specific URL, and extracting and outputting data corresponding to the registered hierarchy.

6. The non-transitory computer-readable recording medium according to claim 5, wherein the position of the part to be extracted is further identified by use of a combination of: a name of a tag or an ordering sequence number of the tag in the document; and a hierarchical structure of tags.

7. A data acquisition method comprising:

identifying a position of a part to be extracted in a document that is associated with a specific URL and includes structural information of tags, the position being on a hierarchical structure of the tags included in the document, and allowing the position on the hierarchical structure to be registered, by a processor; and accessing periodically or non-periodically the document associated with the specific URL, and extracting and outputting data corresponding to the registered position on the hierarchical structure of the tags, by the processor, wherein when data corresponding to the position on the hierarchical structure of the tags, the data having been extracted and registered in the past, is different from data corresponding to the position on the hierarchical structure of the tags, the data having been extracted and registered this time, information indicating that the data have changed is output, by the processor.

8. The data acquisition method according to claim 7, wherein the position of the part to be extracted is further identified by use of a combination of: a name of a tag or an ordering sequence number of the tag in the document; and a hierarchical structure of tags, by the processor.

9. A data acquisition method comprising:

identifying a position of a part to be extracted in a document that is associated with a specific URL and includes structural information of tags, the position being on a hierarchical structure of the tags included in the document, and allowing the position on the hierarchical structure to be registered, by a processor; and accessing periodically or non-periodically the document associated with the specific URL, and extracting and outputting data corresponding to the registered position on the hierarchical structure of the tags, by the processor, wherein when a plurality of positions of the part to be extracted have been registered for the document, output according to the number or rate of data matching past data, in data corresponding to the plurality of positions is performed, by the processor.

10. The data acquisition method according to claim 9, wherein the position of the part to be extracted is further identified by use of a combination of: a name of a tag or an ordering sequence number of the tag in the document; and a hierarchical structure of tags.

11. A data acquisition method comprising:
displaying a document that is associated with a specific URL and described in HTML format or displaying a source of the document, by a processor;
receiving a selection of a part to be extracted that is included in the displayed document or the displayed source of the document, by the processor;
identifying a hierarchy of a tag corresponding to the received part to be extracted, by the processor;
registering the identified hierarchy as information identifying a position of the part to be extracted, by the processor; and
accessing periodically or non-periodically the document associated with the specific URL, and extracting and outputting data corresponding to the registered hierarchy, by the processor.

12. The data acquisition method according to claim 11, wherein the position of the part to be extracted is further identified by use of a combination of: a name of a tag or an ordering sequence number of the tag in the document; and a hierarchical structure of tags.

13. A data acquisition apparatus comprising:
a processor configured to:
identify a position of a part to be extracted in a document that is associated with a specific URL and includes structural information of tags, the position being on a hierarchical structure of the tags included in the document, and allow the position on the hierarchical structure to be registered; and
periodically or non-periodically access the document associated with the specific URL, and extract and output data corresponding to the registered position on the hierarchical structure of the tags, wherein when data corresponding to the position on the hierarchical structure of the tags, the data having been extracted and registered in the past, is different from data corresponding to the position on the hierarchical structure of the tags, the data having been extracted and registered this time, the processor is configured to output information indicating that the data have changed.

14. The data acquisition apparatus according to claim 13, wherein the position of the part to be extracted is further identified by use of a combination of: a name of a tag or an ordering sequence number of the tag in the document; and a hierarchical structure of tags.

15. A data acquisition apparatus comprising:
a processor configured to:
identify a position of a part to be extracted in a document that is associated with a specific URL and includes structural information of tags, the position being on a hierarchical structure of the tags included in the document, and allow the position on the hierarchical structure to be registered; and
periodically or non-periodically access the document associated with the specific URL, and extract and output data corresponding to the registered position on the hierarchical structure of the tags, wherein when a plurality of positions of the part to be extracted have been registered for the document, the processor is configured to perform output according to the number or rate of data matching past data, in data corresponding to the plurality of positions.

16. The data acquisition apparatus according to claim 15, wherein the position of the part to be extracted is further identified by use of a combination of: a name of a tag or an ordering sequence number of the tag in the document; and a hierarchical structure of tags.

17. A data acquisition apparatus comprising:
wherein the processor is configured to
display a document that is associated with a specific URL and described in HTML format or displaying a source of the document;
receive a selection of a part to be extracted that is included in the displayed document or the displayed source of the document;
identify a hierarchy of a tag corresponding to the received part to be extracted;
register the identified hierarchy as information identifying a position of the part to be extracted; and
access periodically or non-periodically the document associated with the specific URL, and extracting and outputting data corresponding to the registered hierarchy.

18. The data acquisition apparatus according to claim 17, wherein the position of the part to be extracted is further identified by use of a combination of: a name of a tag or an ordering sequence number of the tag in the document; and a hierarchical structure of tags.

* * * * *